Figure 1:
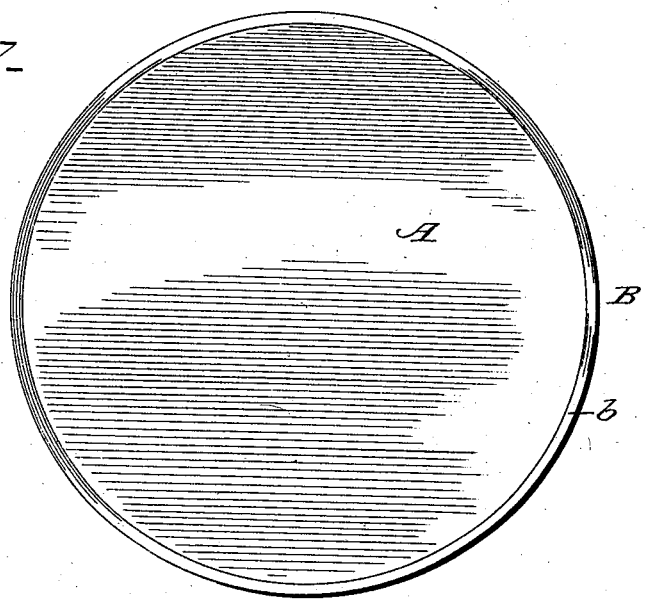

No. 718,517. PATENTED JAN. 13, 1903.
E. L. PERRY.
CASING FOR MATS.
APPLICATION FILED AUG. 27, 1902.
NO MODEL.

Witnesses
G. J. Williamson
M. E. Moore

Inventor
Edward L. Perry.
per Chas. H. Fowler
Attorney

UNITED STATES PATENT OFFICE.

EDWARD L. PERRY, OF PATERSON, NEW JERSEY.

CASING FOR MATS.

SPECIFICATION forming part of Letters Patent No. 718,517, dated January 13, 1903.

Application filed August 27, 1902. Serial No. 121,186. (No model.)

*To all whom it may concern:*

Be it known that I, EDWARD L. PERRY, a citizen of the United States, residing at Paterson, in the county of Passaic and State of New Jersey, have invented certain new and useful Improvements in Casings for Mats; and I do hereby declare that the following is a full, clear, and exact description of the same, reference being had to the annexed drawings, making a part of this specification, and to the letters of reference marked thereon.

The present invention has relation to casings for holding mats of whatever construction and uses to which the mats may be applied; and the object thereof is to provide a casing molded wholly out of soft rubber, so that the same will be flexible and resist any rough usage to which it may be subjected without breaking or cracking and will not scratch or otherwise mar the polished surface of a table or other article of furniture upon which it rests when used as a means for supporting heated articles or vessels containing liquids.

A further purpose of the invention is to provide the casing with an elastic rim to hold the mat therein, a perforated bottom to the casing, and projections upon the under side thereof to raise the casing from contact with its support and allow the air to freely circulate under the casing and come in contact with the mat to dry out the accumulated moisture therein.

The invention consists in a casing for mats of soft rubber and of the construction substantially as shown in the drawings and hereinafter described and claimed.

Figure 2:
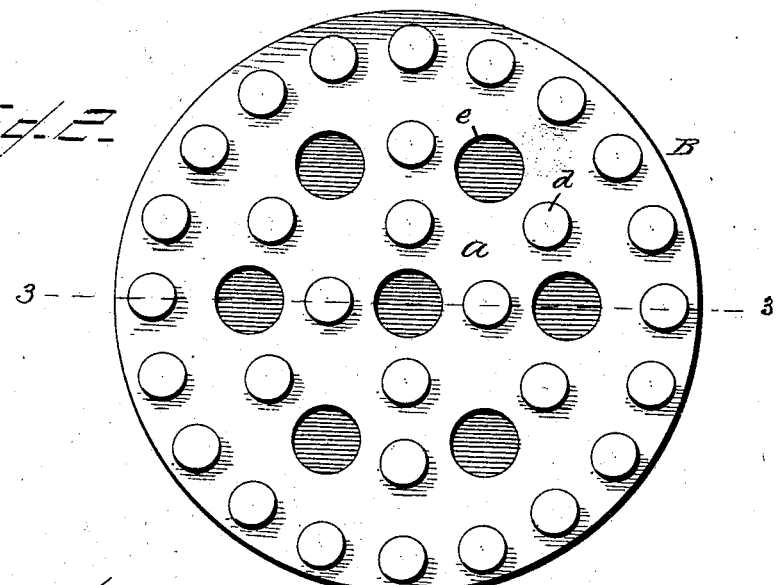
Figure 3:

Figure 1 of the drawings is a plan view of the upper side of a casing for mats constructed in accordance with my invention; Fig. 2, a similar view of the under side thereof; Fig. 3, a longitudinal central section on line 3 3 of Fig. 2.

In the accompanying drawings, A represents the mat, of any suitable form or shape and preferably of an absorbent material, such as asbestos or prepared paper, said mat being held in a casing B, molded wholly of soft rubber in a single piece and of a shape to correspond with that of the mat.

The soft-rubber casing B comprises a base or bottom *a*, which is molded with an upwardly-extending rim *b*, and being of rubber is elastic, its elasticity enabling the mat to be inserted in the casing by the expansion of the rim and when thus inserted is held in place by the contraction of the rim, but capable of being readily removed when desired. To further assist in holding the mat in place, the rim is molded with an inwardly-extending flange *c*, which slightly overlaps the edge of the mat, as shown in Figure 3 of the drawings.

The bottom *a* of the soft-rubber casing B is molded with projections *d* to elevate the bottom from contact with the surface of the table or other support upon which the casing rests. The bottom being thus raised from contact with its support leaves a space between it and the surface of the table or other piece of furniture, thus enabling the air to freely circulate under the casing, and as the bottom thereof is provided with perforations *e* the air will come in direct contact with the mat to dry out any moisture therein when used to support liquid-holding vessels subject to overflow.

The free circulation of the air under the casing which comes in contact with the mat not only dries out the moisture in the mat and that accumulating upon the table, but prevents the polished surface thereof from turning white or otherwise injured by the heat coming in contact therewith.

The advantages of a casing for holding mats molded of soft rubber will be at once apparent from the fact that the polished surface of the table or other piece of furniture will not be scratched or otherwise marred by sliding or moving the casing thereon, which is of material importance in the mats used in restaurants for supporting beer glasses or mugs or other like vessels for containing liquids.

The elasticity of the rim of the casing enables the mat to be readily inserted therein and securely held in place by the expansion and contraction of the rim, respectively, and also conveniently removed when desired.

The bottom of the casing having projections upon its under side together with the perforations therein enables the air to have free circulation under the bottom and come in direct contact with the mat for the purpose hereinbefore described.

The casing being of soft rubber there is no danger of its breaking or becoming injured by rough handling, and consequently it is comparatively indestructible, and the mat being readily removable from the casing a new one may be substituted at any time or the old one removed to be cleaned and replaced.

Having now fully described my invention, what I claim as new, and desire to secure by Letters Patent, is—

1. A molded soft-rubber casing for mats, comprising a perforated bottom with projections upon its under side to elevate the same above its support and allow the air to circulate under the bottom and come in contact with the mat to dry out the moisture therein, said bottom having an upwardly-extending elastic rim to hold the mat in place, substantially as and for the purpose set forth.

2. A molded soft-rubber casing for mats, comprising a perforated bottom with projections upon its under side for elevating the casing above its support, said bottom having an upwardly-extending elastic rim with inwardly-projecting flange, substantially as and for the purpose described.

In testimony that I claim the above I have hereunto subscribed my name in the presence of two witnesses.

EDWARD L. PERRY.

Witnesses:
GEO. M. COPENHAVER,
GEORGE M. BOND.